United States Patent
Nair et al.

(10) Patent No.: US 7,080,184 B2
(45) Date of Patent: Jul. 18, 2006

(54) ISDN-BASED BUS INTERFACE

(75) Inventors: Vinod Nair Gopikuttan Nair, Singapore (SG); Shridhar Mubaraq Mishra, Singapore (SG); Martin Erdmann, Munich (DE)

(73) Assignee: Infineon Technologies Aktiengesellschaft, Munich (DE)

( * ) Notice: Subject to any disclaimer, the term of this patent is extended or adjusted under 35 U.S.C. 154(b) by 287 days.

(21) Appl. No.: 10/065,005

(22) Filed: Sep. 9, 2002

(65) Prior Publication Data

US 2004/0049625 A1    Mar. 11, 2004

(51) Int. Cl.
G06F 13/00    (2006.01)
G06F 13/20    (2006.01)
G06F 13/36    (2006.01)

(52) U.S. Cl. .............. 710/305; 710/302; 710/313; 710/315

(58) Field of Classification Search ............ 710/313, 710/315, 302
See application file for complete search history.

(56) References Cited

U.S. PATENT DOCUMENTS

| | | | | |
|---|---|---|---|---|
| 5,541,930 A | * | 7/1996 | Klingman | 370/524 |
| 6,044,428 A | * | 3/2000 | Rayabhari | 710/305 |
| 6,219,736 B1 | * | 4/2001 | Klingman | 710/315 |
| 6,728,794 B1 | * | 4/2004 | Robinson et al. | 710/8 |
| 6,751,695 B1 | * | 6/2004 | Jirgal | 710/305 |
| 6,772,253 B1 | * | 8/2004 | Slaight et al. | 710/105 |
| 6,779,070 B1 | * | 8/2004 | Connor et al. | 710/315 |

FOREIGN PATENT DOCUMENTS

EP    1 152 343 A1    11/2001

OTHER PUBLICATIONS

"Mit ISDN uber USB surfen", Electronic Industry, No. 3, 1999, pp. 32-34.

* cited by examiner

Primary Examiner—Rehana Perveen
Assistant Examiner—Christopher A. Daley
(74) Attorney, Agent, or Firm—Horizon IP Pte Ltd

(57) ABSTRACT

An interface unit for data transfer between a processor bus and an ISDN-based bus is disclosed. The ISDN-based bus is an IOM-2 bus. The interface unit enables access to all available IOM-2 slots, thereby increasing data transfer rate between the processor and IOM-2 buses.

24 Claims, 3 Drawing Sheets

ISDN-BASED BUS INTERFACE

BACKGROUND OF INVENTION

Integrated Services Digital Network (ISDN) standard has been developed to enable multiple digital channels to be operated simultaneously through existing analog phone lines thereby advantageously increasing their bandwidth. Through the ISDN interface, multiple devices, such as telephone, fax, computer, video conferencing and routers, can share a single line. Information from the various devices can be routed to the proper destination. Generally, ISDN devices transceive information in 8 kHz frames.

An ISDN-oriented modular (IOM-2) bus is an ISDN-based bus. The IOM-2 bus is described in, for example, ICs for communications, IOM-2 Interface Reference Guide, Infineon Technologies, which is herein incorporated by reference for all purposes. The IOM-2 bus provides a symmetrical full-duplex communication link and divides an ISDN frame into 8-bit slots, referred to as "octets" or "timeslots". Two operating modes are available in the IOM-2 interface. The first mode is terminal mode (TE) and the second is the line card mode (LT). In the TE mode, an ISDN frame has 12 octets while 32 octets are provided in the LE mode.

Since IOM-2 devices handle ISDN data, communication is through 2 B-channels for data transfer and 1 D-channel for control signals. These channels are time-multiplexed over a four-wire serial interface. Data is carried over data upstream (DU) and data downstream (DD) signals. Due to the fact that the IOM-2 standard uses the common B- and D-channels for data transmission, only three timeslots (slots) are accessed during an ISDN frame. However, with the availability of high-speed transfer devices, such as Universal Serial Bus (USB) or Ethernet, and the desire to provide integrated services (e.g., voice, data, video), the current bandwidth of the IOM-2 interface is not sufficient.

From the foregoing discussion, it is desirable to increase the bandwidth of existing ISDN-based interfaces.

SUMMARY OF INVENTION

The invention relates to an interface for facilitating communication of data between a processor bus and an ISDN-based bus. In one embodiment, the interface unit comprises a data transfer unit which includes a processor bus interface coupled to a processor bus. The processor bus interface includes a processor buffer. The data transfer unit also includes an ISDN bus interface coupled to an ISDN-based bus. The ISDN bus interface includes an ISDN buffer. A control unit which is provided is coupled to the data transfer unit for controlling the transfer of data between the processor bus and ISDN-based bus.

The interface unit enables access to all available IOM-2 slots for transfer of data between the ISDN-based and processor buses, thus utilizing the total available bandwidth of the IOM-2 interface.

The interface unit enables data transfer to/from high-speed devices coupled to the processor bus from/to existing IOM-2 standard devices, such as, for example, voice devices, like answering machines, ISDN-IP H323 gateways, data devices, and video devices, for example video conferencing. The high-speed devices coupled to the processor bus may, for example, be Universal Serial Bus (USB) devices, ethernet links, etc. Data transmission from memory devices or high-speed devices as described to the interface arrangement provided might be performed via ordinary interrupts or via Direct Memory Access transfers using a DMA controller. Since multiple devices exchange data over the interface arrangement, said interface arrangement can serve as a source for multiple interrupts. It is also possible that one and the same device might exchange different types of data (voice, video, data) on different slots of the IOM-2 serial bus.

According to a preferred embodiment of the present invention, the processor bus interface is coupled to the ISDN bus interface via an interface buffer. The interface buffer comprises a group of register banks having a control input terminal. The group of register banks preferably comprises two register files for each data transmission direction on the processor bus, namely transmit and receive, and for each port of the ISDN-based bus, namely data download and data upload port.

Especially when transmitting data between processor bus and ISDN-based bus, or vice-versa, data latency is of less importance. Data latency is understood as the time between the data appearing on the ISDN-based bus and the same data received by a device like a processor coupled to the processor bus, and vice-versa. The higher the data latency, the lower the constraints are on interrupt latency, thus reducing the coupling between processor and the ISDN-based bus. Interrupt latency is defined as the time between the generation of an interrupt by the interface arrangement and the processor or direct memory access handling the interrupt and performing the data transfer. A higher data latency leads to larger buffering within the interface arrangement.

If, in a further preferred embodiment, the ISDN-based bus is a frame-oriented bus with, for example, frames of 8 kHz divided into several 8-bit slots, the configuration given allows a data latency of 1 frame, meaning 125 ms in the given example.

DETAILED DESCRIPTION

Figure 1:
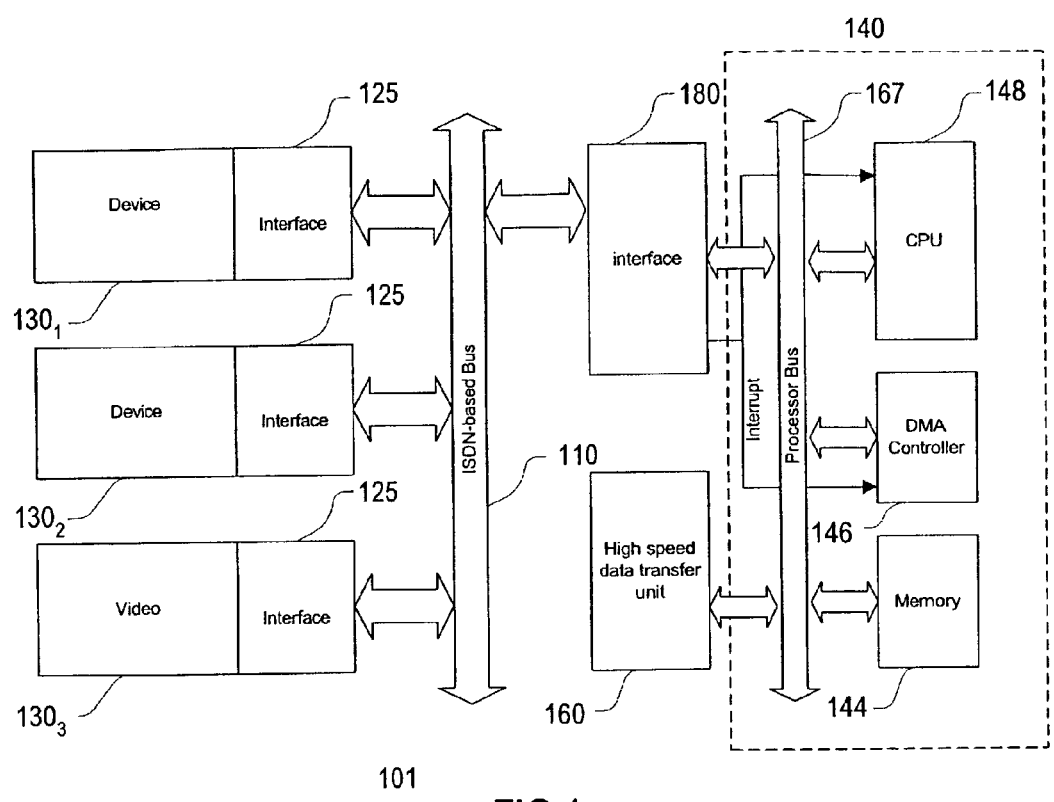
FIG. 1 shows an ISDN-based network in accordance with one embodiment of the invention.

FIG. 1 shows an ISDN-based network 101 comprising an ISDN-based bus 110. In one embodiment, the ISDN-based bus is an IOM-2 bus. Other types of ISDN-based buses can also be used. One or more devices $130_{1-x}$ are coupled to the IOM-2 bus. As shown, the network includes 3 devices $130_{1-3}$. The network can be provided with other number of devices. The various devices are communication devices for transfer of, for example, video, data, and voice (e.g., answering machine or an ISDN-IP H323 gateway to perform voice over Internet Protocol) data. Each device includes an IOM-2 interface 125 to facilitate communication on the bus.

A system 140 is provided with which the devices on the ISDN-based bus communicate. The system comprises, in one embodiment, a central processing unit (CPU) 148, a controller 146 (e.g., a direct memory access (DMA) controller), and a memory module 144 interconnected by a processor bus 167. A high-speed data transfer unit 160, such as a USB or Ethernet device, is coupled to the system via the processor bus. Other types of high speed transfer units and/or additional high-speed data transfer units can also be coupled to the processor bus.

Communication devices on the ISDN-based bus and the system or devices on the processor bus (e.g., high speed data transfer unit) communicates with each other. As previously discussed, the IOM bus comprises a four-wire, full duplex serial bus while the processor bus is a high speed parallel bus. The conventional IOM interfaces divides an ISDN frame into a plurality of slots (e.g., 12 for TE mode and 32 for LT mode). However, due to the physical limitations of the IOM bus, not all the slots of an ISDN frame can be used to transceive data. For example, devices on the IOM-2 bus can only transceive data on two B and one D channels. The limitations of the IOM bus create bottleneck situation for data transfers between the high speed and IOM devices.

In accordance with one embodiment of the invention, an interface unit 180 is provided to facilitate communication between devices on the ISDN-based and processor buses. Communications between ISDN based devices are also possible. The interface is capable of accessing all IOM slots during an ISDN frame, thereby increasing the data bandwidth of conventional IOM-2 interfaces. To illustrate, a video device on the ISDN-based bus can communicate with a USB device on the processor bus at a much higher data bandwidth using the interface device. Since multiple devices exchange data over the interface unit, the interface unit can serve as a source.

Figure 2:
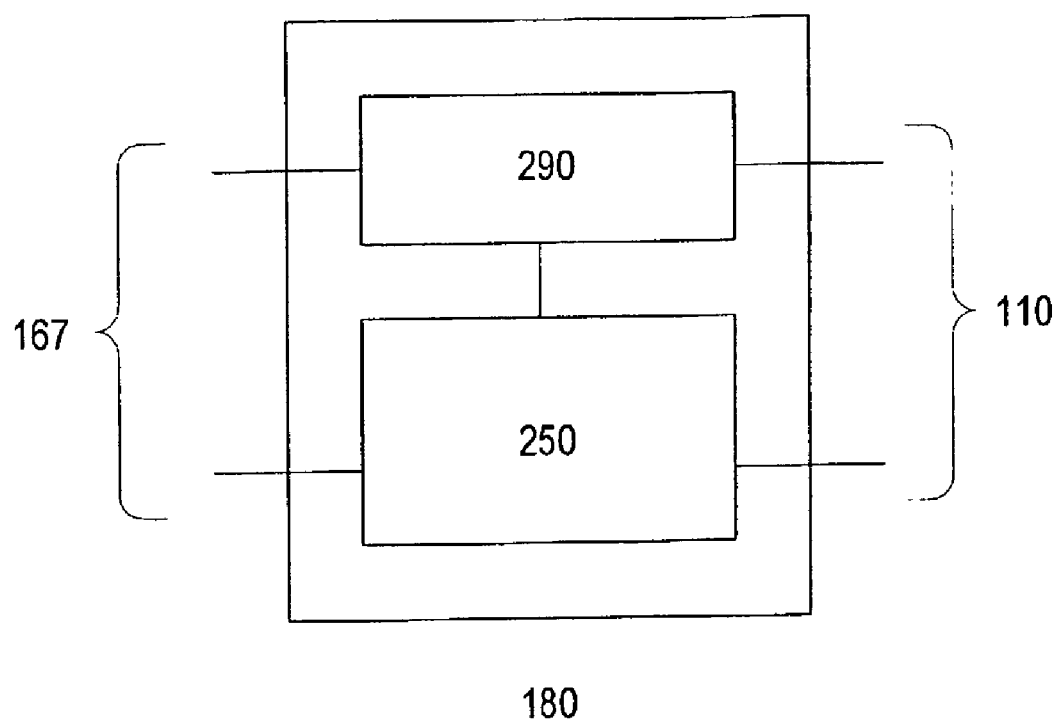
FIG. 2 shows a block diagram of an interface unit in accordance with one embodiment of the invention.

FIG. 2 shows an interface unit in accordance with one embodiment of the invention. The interface unit comprises data transfer and control sub-units 290 and 250. The data transfer sub-unit comprises, in one embodiment, a memory module for buffering data that are to be transferred between the CPU and communication devices. The memory module includes, for example, registers. Data transferred between the buses are stored in IOM format, that is, a register stores one slot of data. For a processor write (data from the memory to communication device), parallel data from the processor is converted to serial data and vice-versa for a processor read (data from the communication device to memory).

When a transfer is to be performed, the processor programs the control sub-unit to determine the direction of transfer (e.g., read or write by processor) and which slot or slots to access. An interrupt is generated by the control sub-unit to service each programmed slot. ISDN-based control signals, such as frame start (FSC) and data clock (DCL) signals, are provided to the control sub-unit for synchronizing the transfer of data.

The interface unit can be designed or configured to satisfy different performance requirements, taking account of latency considerations (e.g., data and interrupt). Data latency is defined as the time between the data appearing on the ISDN-based bus until it is transferred to the processor bus (for processor read) or vice-versa (for a processor write). Interrupt latency, on the other hand, is defined as the time between generation of an interrupt by the interface unit until the data is transferred. The higher the data latency, the lower the constraints are on the interrupt latency (e.g., greater decoupling between the communication devices and processor). However, higher data latency requires larger buffering or data storage in the data sub-unit of the interface unit.

In one embodiment, the interface unit is configured to operate with a latency of one ISDN frame, referred to as "frame-based" processing. For such applications, the data storage sub-unit comprises sufficient buffering to accommodate 1 frame of ISDN-based data (e.g., 12 octets for TE mode and 32 octets for LT mode). This represents a data latency of 1 frame per interrupt. Generally, an ISDN frame is equal to 125 µs.

Alternatively, the interface unit is configured to operate with a latency of 1 octet, referred to as "slot-based" processing. This represents a data latency of 1 slot per interrupt. Configuring the interface unit to operate with other data latencies is also useful, for example, between slot-based and frame-based processing (greater than 1 octet but less than 1 frame).

Figure 3:
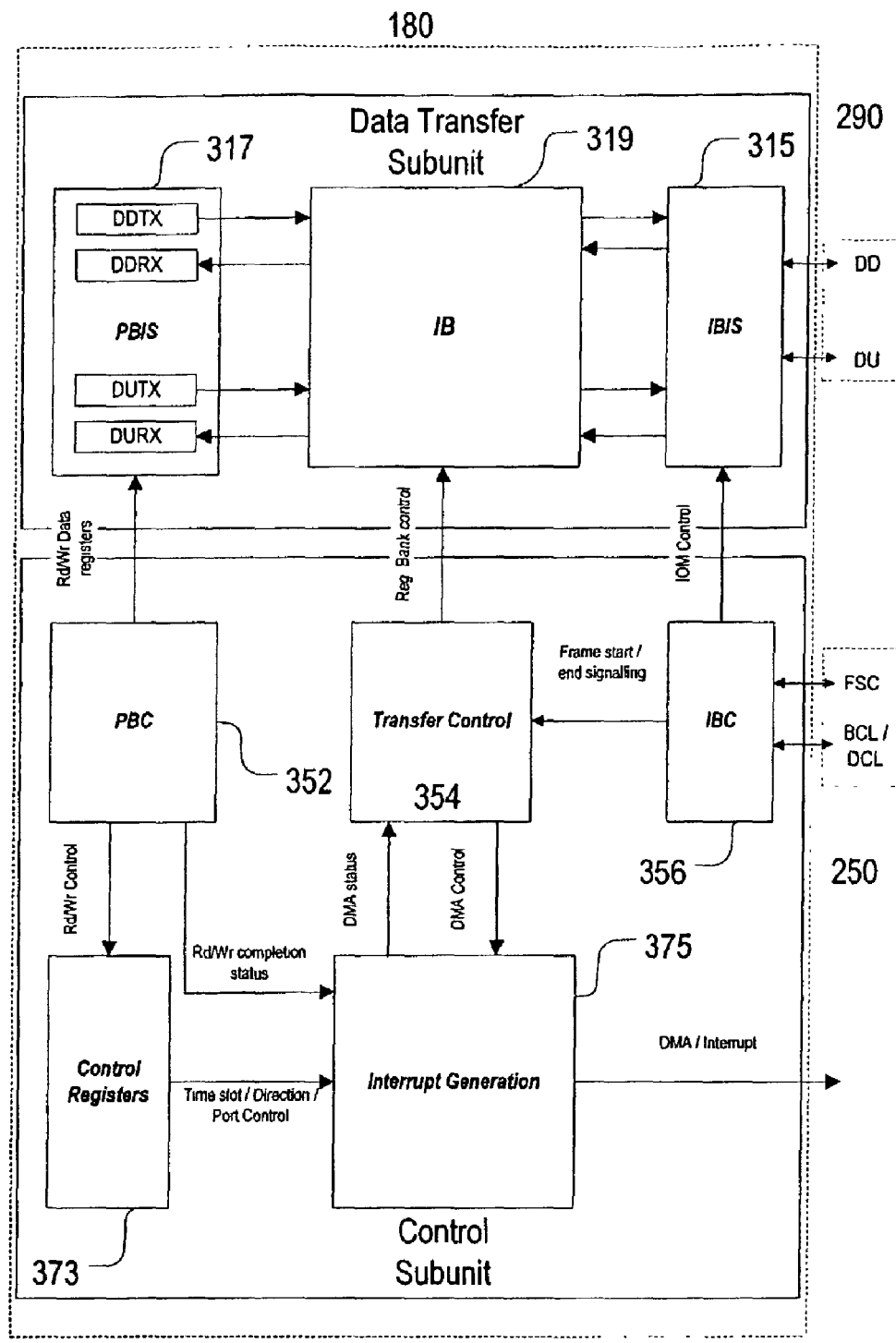
FIG. 3 shows a block diagram of an interface unit in accordance with another embodiment of the invention.

FIG. 3 shows an interface unit 180 in accordance with another embodiment of the invention. The interface unit is configured with a data latency equal to 1 IOM-2 frame. The interface unit includes data transfer and control sub-units 290 and 250. The data sub-unit is coupled to the processor bus on one side and the IOM-2 bus on the other side. The transfer and control sub-units are coupled to the ISDN-based and processor buses. Data to be transferred between the ISDN-based and processor buses are stored in the data transfer sub-unit. Likewise, the control sub-unit is coupled to both the processor and ISDN-based buses as well as the data sub-unit. The control sub-unit receives control information from the processor and communication devices, controlling the transfer of data between the processor and the devices.

In one embodiment, the data transfer sub-unit comprises ISDN-based bus (IBIS) and processor bus interface storage (PBIS) blocks 315 and 317. The IBIS block is coupled to the ISDN-based bus. In particular, the IBIS block is coupled to the data lines (DD and DU) of the ISDN-based bus via DD and DU ports. The IBIS block comprises a memory unit for storing data that are to be transferred to or received from the ISDN-based bus. In one embodiment, the memory unit comprises shift registers for parallel-to-serial or serial-to-parallel conversion, depending on the direction of the transfer. In one embodiment, at least one shift register is associated with a port. For example, if data is transferred from the processor to the communication device, the processor sends parallel data to the interface unit which the IBIS converts to serial data for transmission on the ISDN-based bus. In a preferred embodiment, two shift registers are provided for each port.

The PBIS block is coupled to the processor bus and comprises a memory unit for buffering data that are to be read by or written from the processor. In one embodiment, the memory unit comprises registers. The PBIS block is coupled to the IBIS via PBIS ports for transfer of data between the PBIS and IBIS blocks. In one embodiment, at least one PBIS port is provided for the DU and DD ports. A register is provided of each IBIS port. In a preferred embodiment, two PBIS ports are associated with DD and DU ports. One is for the transmit direction and the other for receive direction (DDTX, DDRX, DUTX, and DURX). In one embodiment, the IBIS includes a shift register for each PBIS port. In one embodiment, an interface buffer (IB) unit 319 provides intermediate buffering of data between the PBIS and IBIS blocks. The IB unit comprises a plurality of register banks. A register bank includes a plurality of registers, forming a register stack. In one embodiment, first and second register banks are provided for each data port. Preferably, a pair of register banks is provided for each port per direction. For example, four pairs of register banks are provided, one each for DDTX, DDRX, DUTX, and DURX.

In one embodiment, the register banks operate in a first-in-first-out (FIFO) configuration. In the processor transmit or write direction (from processor bus to ISDN-based bus), one of the register banks is used to deliver data to the IBIS block, while the other register bank accepts data from PBIS for the following frame. In one embodiment, the stack is sufficient to accommodate buffering a complete frame. In the following frame, the two register banks exchange their roles (e.g., from receiving to transmitting and vice-versa). Similarly, in the receive read direction (from ISDN-based bus to processor bus), one register bank accepts data from the IBIS block while the other allows the processor or DMA controller to read data of the previous frame. This dual buffering scheme allows the processor on the one hand and the ISDN-based bus the other hand to process data at their own data rates. Depending on the size of the register banks, either the whole frame or all slots of the frame are buffered or a portion of the frame is buffered. If a whole frame is buffered, the interface introduces a data latency of one ISDN-based frame.

In one embodiment, the control unit 250 comprises a processor bus control (PBC) block 352, a control register block 373, a transfer control block 354, an ISDN-based control (IBC) block 356, and an interrupt generation block 375. The control register block, which is coupled to the processor bus, receives control information to program the interface for data transfer. In one embodiment, the control register block comprises a plurality of registers which can be programmed by the processor. In one embodiment, a register is provided per interrupt which defines the direction (Receive/Transmit) and the line (DD/DU) to be used for the corresponding data. For example, control register for interrupt 0 can be configured to receive on DD (e.g., DDRX) for slots 0, 4, and 5. The number of interrupts can depend on the implementation and design needs. The use of interrupts provides flexibility for accessing all or different time slots for each transfer. For example, different devices can access different slots or different types of data can be allocated to different slots.

The PBC block, based on the programming of the control register block, controls the PBIS block. The appropriate port and time slots are selected, including the direction of the transfer. The IBC block receives FSC and DCL signals to provide accurate octet or slot timing information to the transfer control block. Also, the IBC block controls the IBIS block for transfer of information between it and the ISDN-based bus.

At the end of each frame, the transfer control unit toggles the register banks in the IB unit so that the data received from the ISDN-based bus in the previous frame can be transferred to the CPU and the data provided by the CPU can be shifted out onto the ISDN-based interface. Frame information is passed to the interrupt generation block. In one embodiment, the interrupt generation block loops through the slots and asserts the interrupt(s) associated with the slots. The corresponding data is transferred for each interrupt. After all interrupts programmed for a slot are serviced, it proceeds to the next slot. For processor systems with bit width greater than 8 (e.g., xtimes 8, such as 16, 32, or 64), data for multiple slots can be transferred in a single read/write cycle.

In an alternative embodiment, the interface unit can be configured for slot based processing. For slot-based processing, the interrupt generation block generates an interrupt for every slot of data to be transferred as well as the completion of all interrupts. For slot based applications, the register banks in the IB block can be replaced with registers. The data is received from the IBIS block and transferred to the PBIS block for processor reads or vice-versa for processor writes. If an interrupt is not completed within one slot, the control sub-unit advances to the next slot. As a result, data transfer is highly coupled to the ISDN clock BCL/DCL.

Establishing a data loop for testing the interface unit can be accomplished by programming the addresses of data upload receive, data download receive, data upload transmit, and data download transmit registers as the source and destination addresses for the DMA transfer, respectively. A similar data loop can be established by connecting the data download and data uploads ports.

As described, the interface unit can access all slots, not only two B- and one D-channel for signaling information and data transfer, respectively, as in conventional ISDN-based systems, thus making available the full ISDN bandwidth for data transfers.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

The invention claimed is:

1. An interface unit disposed between an integrated services digital network (ISDN) based bus and a processor bus, wherein data in the ISDN-based bus is transferred in ISDN frames divided into a plurality of timeslots, the ISDN-based bus comprises an ISDN-oriented modular bus in which data is transferred in common channels which prevents all timeslots of an ISDN frame from being accessed, the interface unit comprising:
   a data transfer unit includes
      a processor bus interface coupled to a processor bus, the processor bus interface includes
      a processor buffer,
      an ISDN bus interface coupled to an ISDN-based bus, the ISDN bus interface includes
      an ISDN buffer; and
   a control unit coupled to the data transfer unit for controlling the transfer of data between the processor bus and ISDN-based bus,
   wherein the interface unit facilitates communication between a device coupled to the ISDN-based bus and a device coupled to the processor bus, the interface unit is capable of accessing all timeslots in an ISDN flame for data transfer.

2. The interface unit of claim 1 wherein said processor bus interface is coupled to the ISDN-based bus interface via Sn interface buffer comprising a group of register banks, said group of register banks having a control input terminal.

3. The interface unit of claim 2 wherein the control unit further comprises a register bank control unit coupled to the interface buffer for controlling the group of register banks.

4. The interface unit of claim 1 wherein the ISDN buffer comprises at least one shift register for parallel/serial data conversion.

5. The interface unit of claim 1 wherein The processor bus interconnects a central processing unit, a memory unit and peripheral devices.

6. The interface unit of claim 5 wherein the ISDN-based bus is coupled to voice, data and/or video devices.

7. The interface unit of claim 1 wherein said processor bus is connected to a high-speed data transfer unit.

8. The interface unit of claim 7 wherein the high-speed data transfer unit is a Universal Serial Bus.

9. An interface which to facilitates communication between an ISDN-based bus and a processor bus, the ISDN-based bus transfers data in common channels which prevents all timeslots of an ISDN frame from being accessed, the interface comprising:
- a data transfer unit for buffering data that are to be transferred between a device coupled to the processor bus and a device on the ISDN-based bus; and
- a control unit coupled to the data transfer unit for controlling the transfer of data between the device coupled to the processor bus and the device coupled to the ISDN-based bus, wherein the interface is capable of accessing all timeslots of an ISDN frame for data transfer.

10. The interface of claim 9 wherein the control unit is programmed to determine the direction of data transfer and which slot or slots to access.

11. The interface of claim 10 either operates in frame-based processing or in slot-based processing.

12. The interface of claim 10 wherein the data transfer unit comprises a memory module for buffering data that are to be transferred between the processor bus and the ISDN-based bus.

13. The interface of claim 12 either operates in frame-based processing or in slot-based processing.

14. The interface of claim 9 wherein the data transfer unit comprises a memory module for buffering data that are to be transferred between the processor bus and the ISDN-based bus.

15. The interface of claim 14 either operates in frame-based processing or in slot-based processing.

16. The interface of claim 9 either operates in frame-based processing or in slot-based processing.

17. The interface of claim 9 wherein the data transfer unit comprises:
- processor bus interface storage (PBIS) block coupled to the processor bus, wherein the PBIS includes a PBIS memory wilt fir buffering data that are to be transferred to or received from the processor bus; and
- ISDN-based bus interface storage (IBIS) block coupled to the ISDN-based bus, wherein the IBIS includes an IBIS memory unit for storing data that are to be transferred to or received from the ISDN-based bus.

18. The interface of claim 17 wherein the control unit comprises a control register block (CRB) coupled to the processor bus for receiving control information for programming the interface, wherein based on the information, the appropriate port, time slots and direction are selected for data transfer.

19. The interface of claim 17 wherein the data transfer unit further comprises an interface buffer (IB) coupled to the PBIS and IBIS, the IB provides intermediate buffering of data between the PBIS and IBIS blocks.

20. The interface of claim 19 wherein the IB comprises a plurality of register banks, each register bank comprising a plurality of registers to form a register stack.

21. The interface of claim 19 wherein the IB includes first and second register banks for each data port, wherein each register bank comprises a plurality of registers to form a register stack.

22. The interface of claim 9 wherein the control unit comprises a control register block (CRB) coupled to the processor bus for receiving control information for programming the interface, wherein based on the information, the appropriate port, time slots and direction are selected for data transfer.

23. A method of transferring data between an ISDN-based bus and a processor bus in which the ISDN based bus transfers data in common channels, preventing all timeslots of an ISDN frame from being accessed comprising:
- storing data to be transferred between a device coupled tote ISDN-based bus and a device coupled to the processor bus in a data transfer unit of an interface; and
- transferring stored data between the device coupled to the ISDN-based bus and the device coupled to the processor bus, wherein all timeslots of an ISDN frame are capable of being accessed for data transfer.

24. An interface disposed between an integrated services digital network (ISDN) based bus and a processor bus, wherein data in the ISDN-based bus is transferred in ISDN frames divided into a plurality of timeslots, the data is transferred in common channels which prevents all timeslots of an ISDN frame from being accessed, the interface comprising:
- a data transfer unit includes
  - a processor bus interface coupled to a processor bus, the processor bus interface includes
  - a processor buffer,
  - an ISDN bus interface coupled to an ISDN-based bus, the ISDN bus interface includes an
  - ISDN buffer; and
- a control unit coupled to the data transfer wilt for controlling the transfer of data between the processor bus and ISDN-based bus,
- wherein the interface unit facilitates communication between a device coupled to the ISDN-based bus and a device coupled to the processor bus via an universal serial port, the interface unit is capable of accessing all timeslots in an ISDN frame the data transfer.

* * * * *